(12) United States Patent
Takami et al.

(10) Patent No.: US 8,168,349 B2
(45) Date of Patent: May 1, 2012

(54) FUEL CELL-PURPOSE ELECTROLYTE MATERIAL AND PRODUCTION METHOD THEREFOR

(75) Inventors: Masayoshi Takami, Hamamatsu (JP); Toshihiko Yoshida, Fujimi (JP); Masahiro Ueda, Kyoto (JP); Yuri Tomisaka, Kyoto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 720 days.

(21) Appl. No.: 12/085,303

(22) PCT Filed: Feb. 22, 2007

(86) PCT No.: PCT/IB2007/000421
§ 371 (c)(1), (2), (4) Date: May 21, 2008

(87) PCT Pub. No.: WO2007/096747
PCT Pub. Date: Aug. 30, 2007

(65) Prior Publication Data
US 2009/0136819 A1 May 28, 2009

(30) Foreign Application Priority Data

Feb. 22, 2006 (JP) ................. 2006-045100

(51) Int. Cl.
*H01M 8/10* (2006.01)
(52) U.S. Cl. .............. 429/493; 429/492; 252/62.2
(58) Field of Classification Search .......... 429/492, 429/493; 252/62.2
See application file for complete search history.

(56) References Cited

U.S. PATENT DOCUMENTS

| 6,528,240 | B1 | 3/2003 | Kishimura et al. |
| 7,132,565 | B2 * | 11/2006 | Liaw et al. ............. 560/128 |
| 2004/0214065 | A1 * | 10/2004 | Kanaoka et al. ............. 429/33 |
| 2005/0019638 | A1 | 1/2005 | Ravikiran et al. |
| 2005/0153233 | A1 | 7/2005 | Wu et al. |

FOREIGN PATENT DOCUMENTS

| JP | 63017992 A * | 1/1988 |
| JP | 2001-19723 | 1/2001 |
| JP | 2003-297144 | 10/2003 |
| JP | 3572302 | 7/2004 |

OTHER PUBLICATIONS

International Search Report, Jul. 2007.
Written Opinion of the ISR, Dec. 2007.

* cited by examiner

*Primary Examiner* — Gregg Cantelmo
(74) *Attorney, Agent, or Firm* — Finnegan, Henderson, Farabow, Garrett & Dunner, LLP (57) ABSTRACT

A fuel cell-purpose electrolyte material having a structural unit represented by a general formula (1):

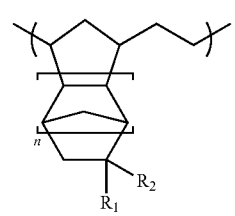

(1)

where n is 0 or a positive integer, and $R_1$ represents H or $CH_3$, and $R_2$ represents $(CH_2)_m SO_3 H$ (m is 0 or a positive integer).

7 Claims, 5 Drawing Sheets

FUEL CELL-PURPOSE ELECTROLYTE MATERIAL AND PRODUCTION METHOD THEREFOR

FIELD OF THE INVENTION

The invention relates to a fuel cell-purpose electrolyte material capable of providing a fuel cell-purpose solid electrolyte membrane of the like that is excellent in oxidation resistance, flexibility, heat resistance, etc., and a production method for the material.

BACKGROUND OF THE INVENTION

A solid polymer fuel cell (hereinafter, sometimes referred to as "fuel cell") can easily be reduced in size and weight, and is expected to be put into practical use as an electric power source of mobile vehicles, such as electric motor vehicles and the like, and small-size co-generation systems and the like.

A fuel cell-purpose solid electrolyte membrane (hereinafter, sometimes referred to as "solid electrolyte membrane") is generally required to have high proton conductivity and high oxidation resistance. In order to satisfy such a characteristic requirement, fluorine-based electrolyte membranes represented by a perfluorosulfonic acid membrane have been used. However, fluorine-based electrolytes are costly, and have problems of, for example, elution of hydrofluoric acid during long-time use or the like.

As materials alternative to the fluorine-based electrolyte membranes, hydrocarbon-based electrolyte membranes made of so-called engineered plastics, such as polyether sulfone (PES), polyether ether-ketone (PEEK), etc., have been proposed. In comparison with the fluorine-based electrolyte membranes, the hydrocarbon-based electrolyte membranes have advantages of being less costly and being free from the risk of elution of hydrofluoric acid or the like. However, since all the hydrocarbon-based electrolyte membranes are aromatic electrolyte membranes that have benzene rings or the like in the molecules, the hydrocarbon-based electrolyte membranes are low in flexibility and, when used as a solid electrolyte membrane of a fuel cell, has problems of formation of cracks or the like.

In view of these problems, solid electrolyte membranes that do not have a benzene ring or the like have been developed. For example, Japanese Patent No. 3572302 discloses a solid electrolyte membrane formed by using an epoxy compound and a silane compound as raw material components. This solid electrolyte membrane, having no benzene ring in its molecule, is excellent in flexibility, but has problems of being inferior in oxidation resistance and the like since the membrane has, in its molecule, an epoxy component derived from the epoxy component.

DISCLOSURE OF THE INVENTION

It is a main object of the invention to provide a fuel cell-purpose electrolyte material capable of providing a fuel cell-purpose solid electrolyte membrane or the like that is excellent in oxidation resistance, flexibility, heat resistance, etc.

A first aspect of the invention relates to a fuel cell-purpose electrolyte material. The fuel cell-purpose electrolyte material of the first aspect of the invention has a structural unit represented by a general formula (1):

where n is 0 or a positive integer, and $R_1$ represents H or $CH_3$, and $R_2$ represents $(CH_2)_m SO_3H$ (m is 0 or a positive integer).

According to the fuel cell-purpose electrolyte material of the first aspect of the invention, since the structural unit represented by the general formula (1) is provided, a fuel cell-purpose electrolyte material excellent in oxidation resistance, flexibility, heat resistance, etc. can be obtained. The aforementioned structural unit, except for the sulfonic acid group, which is a proton-conducting group, has none of an oxygen atom (O), a nitrogen atom (N), a sulfur atom (S) and a double bond, and is therefore excellent in the resistance to acids and radicals (acid resistance). Furthermore, the structural unit has another advantage of being excellent in flexibility due to not having a benzene ring, which is possessed by the engineered plastics, and a further advantage of being excellent in heat resistance due to having an alicyclic site.

The fuel cell-purpose electrolyte material of the first aspect of the invention may further have a structural unit that has a saturated alicyclic hydrocarbon, in addition to the structural unit represented by the general formula (1). The structural unit that has a saturated alicyclic hydrocarbon is also excellent in oxidation resistance, flexibility and heat resistance, similarly to the structural unit represented by the general formula (1).

In the fuel cell-purpose electrolyte material of the first aspect of the invention, the structural unit that has a saturated alicyclic hydrocarbon may be a structural unit represented by a general formula (2):

where k is 0 or a positive integer, and $R_3$ represents H or $CH_3$. The structural unit represented by the general formula (2) is excellent in oxidation resistance, flexibility and heat resistance, similarly to the structural unit represented by the general formula (1).

The fuel cell-purpose electrolyte material of the first aspect of the invention may be a block copolymer that has a structural unit represented by the general formula (1) and the structural unit that has a saturated alicyclic hydrocarbon. If the fuel cell-purpose electrolyte material of the invention is a block copolymer, a structure in which sulfonic acid groups, which are proton-conducting groups, are densely present is readily formed, so that a fuel cell-purpose electrolyte material excellent in proton conductivity can be obtained.

A second aspect of the invention relates to a fuel cell-purpose solid electrolyte membrane. This fuel cell-purpose solid electrolyte membrane is formed from a fuel cell-purpose electrolyte material described above.

According to the fuel cell-purpose solid electrolyte membrane of the second aspect of the invention, the use of the fuel cell-purpose electrolyte material provides a solid electrolyte membrane that is excellent in oxidation resistance, flexibility, heat resistance, etc.

A third aspect of the invention relates to a production method for a fuel cell-purpose electrolyte material. The production method for the fuel cell-purpose electrolyte material has the steps of: preparing, as a raw material, a compound represented by a general formula (3):

(3)

where n is 0 or a positive integer, and $R_1$ represents H or $CH_3$, and $R_2$ represents $(CH_2)_m SO_3(CH_2)_p H$ (m is 0 or a positive integer, and p is 0 or a positive integer); and polymerizing the compound to form a polymer that has a structural unit represented by a general formula (1):

(1)

where n is 0 or a positive integer, and $R_1$ represents H or $CH_3$, and $R_2$ represents $(CH_2)_m SO_3 H$ (m is 0 or a positive integer).

According to the production method for a fuel cell-purpose electrolyte material of the third aspect of the invention, since the compound represented by the general formula (3) is used, a fuel cell-purpose electrolyte material which has a structural unit represented by the general formula (1) and which is excellent in oxidation resistance, flexibility and heat resistance can be obtained.

In the third aspect of the invention, in the polymerizing step, by using also as a raw material a compound represented by a general formula (4):

(4)

where k is 0 or a positive integer, and $R_3$ represents H or $CH_3$, a structural unit represented by a general formula (5):

(5)

where x is a positive integer, and n is 0 or a positive integer, and $R_1$ represents H or $CH_3$, and $R_2$ represents $(CH_2)_m SO_3 H$ (m is 0 or a positive integer), and y is a positive integer, and k is 0 or a positive integer, and $R_3$ represents H or $CH_3$, may be formed. By using the compound represented by the general formula (4), a fuel cell-purpose electrolyte material which has a structural unit represented by the general formula (5) and which is excellent in oxidation resistance, flexibility and heat resistance can be obtained.

In the third aspect of the invention, in the polymerizing step, a Grubbs catalyst may be used. The use of a Grubbs catalyst makes it possible to efficiently produce the fuel cell-purpose electrolyte material.

In this invention, the use of the fuel cell-purpose electrolyte material having a structural unit represented by the general formula (1) achieves an effect of providing a fuel cell-purpose solid electrolyte membrane or the like that is excellent in oxidation resistance, flexibility, heat resistance, etc.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Hereinafter, the fuel cell-purpose electrolyte material, the fuel cell-purpose solid electrolyte membrane, and the production method for the fuel cell-purpose electrolyte material of the invention will be described in detail.

A. Fuel Cell-Purpose Electrolyte Material

Firstly, the fuel cell-purpose electrolyte material of the invention will be described. The fuel cell-purpose electrolyte material of the invention has a structural unit represented by the following general formula (1):

(1)

where n is 0 or a positive integer, and $R_1$ represents H or $CH_3$, and $R_2$ represents $(CH_2)_m SO_3H$ (m is 0 or a positive integer). Various constructions of the fuel cell-purpose electrolyte material of the invention will be described below.

1. Structural Unit

Firstly, the structural unit of the fuel cell-purpose electrolyte material of the invention will be described. The fuel cell-purpose electrolyte material of the invention has at least a structural unit represented by the general formula (1). Therefore, the fuel cell-purpose electrolyte material of the invention may be a polymer that has only a structural unit represented by the general formula (1). Furthermore, the fuel cell-purpose electrolyte material may also be a polymer that has a structural unit represented by the general formula (1) and a structural unit other than the structural unit represented by the general formula (1) (sometimes referred to as "other structural unit"). Hereinafter, the structural unit represented by the general formula (1) will be described, and subsequently the other structural unit will be described.

(1) Structural Unit Represented by General Formula (1)

In the general formula (1), n is 0 or a positive integer. The numerical range of n is not particularly limited, but is ordinarily within the range of 0 to 2, and is preferably 0 or 1 and, particularly, 0. Furthermore, in the general formula (1), $R_2$ represents $(CH_2)_m SO_3H$ (m is 0 or a positive integer). The numerical range of m is not particularly limited, but is ordinarily within the range of 0 to 8, and is preferably 0 or 1 and, particularly, 0.

Concrete examples of the structural unit represented by the general formula (1) include structural units represented by structural formulas (1-a) to (1-f) shown below, etc. Among them, the structural unit represented by the structural formula (1-a) is preferable.

(1-a)

(1-b)

(1-c)

(1-d)

(1-e)

(1-f)

Although the fuel cell-purpose electrolyte material of the invention has at least a structural unit represented by the general formula (1), the rate of content thereof is not particularly limited. However, it is preferable that in the invention, the structural unit represented by the general formula (1) be contained within the range of 20 to 100 mol % and, particularly, within the range of 40 to 90 mol %. Such a rate of content of the structural unit will provide a fuel cell-purpose electrolyte material that is excellent in oxidation resistance, flexibility, heat resistance, etc.

(2) Other Structural Unit

Next, the other structural unit (or units) in the invention will be described. The other structural unit is ordinarily formed by using a compound that is polymerizable with a compound that is used to form the structural unit of the general formula (1) in the production of the fuel cell-purpose electrolyte material of the invention.

The other structural unit is not particularly limited as long as the other structural unit is formed by using a compound that is polymerizable as mentioned above. Examples thereof include a structural unit that has a saturated alicyclic hydrocarbon, a structural unit that has saturated hydrocarbon, a structural unit that has an unsaturated hydrocarbon, etc. Among them, the structural unit that has a saturated alicyclic hydrocarbon is particularly preferable. The structural unit that has a saturated alicyclic hydrocarbon is excellent in oxidation resistance, flexibility and heat resistance, similarly to the structural unit represented by the general formula (1). That is, it is preferable that the fuel cell-purpose electrolyte material of the invention have a structural unit that has a saturated alicyclic hydrocarbon, in addition to the structural unit represented by the general formula (1).

The structural unit that has a saturated alicyclic hydrocarbon is not particularly limited, and concrete examples thereof include a structural unit represented by the general formula (2):

(2)

where k is 0 or a positive integer, and $R_3$ represents H or $CH_3$.

In the general formula (2), k is 0 or a positive integer. The numerical range of k is not particularly limited, but is ordinarily within the range of 0 to 2, and is preferably 0 or 1 and, particularly, 0.

Concrete examples of the structural unit represented by the general formula (2) include structural units represented by structural formulas (2-a) to (2-d) shown below. Among them, the structural unit represented by structural formula (2-a) is preferable.

(2-a)

(2-b)

(2-c)

(2-d)

On the other hand, the structural unit that has a saturated hydrocarbon is not particularly limited, and examples thereof include structural units in which the carbon number of the saturated hydrocarbon is within the range of 2 to 4, etc. The aforementioned saturated hydrocarbon may be a straight-chain saturated hydrocarbon, or may also be a branched saturated hydrocarbon.

The structural unit that has an unsaturated hydrocarbon is not particularly limited, and examples thereof include structural units in which the carbon number of the unsaturated hydrocarbon is within the range of 2 to 4, etc. Besides, the aforementioned unsaturated hydrocarbon ordinarily has a double bond. Furthermore, the unsaturated hydrocarbon may be a straight-chain unsaturated hydrocarbon, or may also be a branched unsaturated hydrocarbon. In addition, by hydrogenating the unsaturated hydrocarbon, it is also possible to form a structural unit having a saturated hydrocarbon that is excellent in oxidation resistance.

2. Fuel Cell-Purpose Electrolyte Material

The fuel cell-purpose electrolyte material of the invention has at least a structural unit represented by the general formula (1). Therefore, the fuel cell-purpose electrolyte material of the invention may be a polymer that has only a structural unit represented by the general formula (1), or may also be a polymer that has a structural unit represented by the general formula (1) and an other structural unit.

In the case where the fuel cell-purpose electrolyte material of the invention is a polymer that has a structural unit represented by the general formula (1) and an other structural unit, the kind of the polymer is not particularly limited, and concrete examples thereof include a random copolymer, a block copolymer, etc. Among them, a block copolymer is preferable. If the fuel cell-purpose electrolyte material of the invention is a block copolymer, a structure in which sulfonic acid groups, which are proton-conducting groups, are densely present is readily formed, so that a fuel cell-purpose electrolyte material excellent in proton conductivity can be obtained.

Particularly, it is preferable that the fuel cell-purpose electrolyte material of the invention be a block copolymer that has a structural unit represented by the general formula (1) and a structural unit represented by the general formula (2). Concretely, it is preferable that the fuel cell-purpose electrolyte material be a block copolymer that has a structural unit represented by the following general formula (5):

(5)

where, x is a positive integer, and n is 0 or a positive integer, and $R_1$ represents H or $CH_3$, and $R_2$ represents $(CH_2)_m SO_3H$ (m is 0 or a positive integer), and y is a positive integer, and k is 0 or a positive integer, and $R_3$ represents H or $CH_3$.

In the general formula (5), the ratio between x and y is not particularly limited. For example, if x is assumed to be 100, y is ordinarily within the range of 0 to 500, and is preferably within the range of 20 to 200.

In the case where the fuel cell-purpose electrolyte material of the invention is a block copolymer that has a structural unit represented by the general formula (5), the weight-average molecular weight of the fuel cell-purpose electrolyte material is not particularly limited, but is ordinarily within the range of 50,000 to 5,000,000. Incidentally, the aforementioned weight-average molecular weight is found by a gel permeation chromatography (GPC) method through the use of polystyrene as a standard.

Particularly, in the invention, it is preferable that the fuel cell-purpose electrolyte material be a block copolymer that has a structural unit represented by the following structural formula (5-a):

(5-a)

On the other hand, in the case where the fuel cell-purpose electrolyte material of the invention is a polymer that only has a structural unit represented by the general formula (1), the polymer may be a homocopolymer that has a single structural unit represented by the general formula (1), or may also be a random copolymer, a block copolymer, an alternating copolymer or the like that has a plurality of structural units represented by the general formula (1).

3. Production Method for Fuel-Cell Purpose Electrolyte Material

Next, a production method for the fuel cell-purpose electrolyte material of the invention will be described. The production method for the fuel cell-purpose electrolyte material of the invention is not particularly limited as long as the method is capable of producing a fuel cell-purpose electrolyte material as described above. Concrete description thereof will be given later in "C. PRODUCTION METHOD FOR FUEL CELL-PURPOSE ELECTROLYTE MATERIAL", and will be omitted herein.

4. Uses of Fuel Cell-Purpose Electrolyte Material

Next, uses of the fuel cell-purpose electrolyte material of the invention will be described. The fuel cell-purpose electrolyte material of the invention may be used as a material of a solid electrolyte membrane that constitutes a membrane-electrode composite (MEA), and may also be used as an electrolyte material contained in a catalyst electrode layer, similarly to Nafion (trade name, by DuPont), which is a common fuel cell-purpose electrolyte material. In particular, in the invention, it is preferable to use the fuel cell-purpose electrolyte material as a material of a solid electrolyte membrane. The fuel cell-purpose electrolyte material of the invention provides a solid electrolyte membrane that is excellent in oxidation resistance, flexibility, heat resistance, etc.

In the invention, there is provided a fuel cell-purpose solid electrolyte membrane that is formed by using the foregoing fuel cell-purpose electrolyte material. Ordinarily, the fuel cell-purpose solid electrolyte membrane is provided with catalyst electrode layers containing a catalyst such as Pt/C or the like, on two opposite surfaces thereof, so as to form a membrane-electrode composite. The shape of the solid electrolyte membrane is not particularly limited, and examples thereof include a flat platy shape, a tubular shape, etc. Ordinarily, in the case where the shape of the solid electrolyte membrane is a tubular shape, the inner surface of the solid electrolyte membrane is provided with a concentric inner catalyst electrode layer, and an inner current collector is placed inwardly of the inner catalyst electrode layer. Furthermore, the outer surface of the solid electrolyte membrane is provided with a concentric outer catalyst electrode layer, and an outer current collector is placed outwardly of the outer catalyst electrode layer.

C. Production Method for Fuel Cell-Purpose Electrolyte Material

Next, the production method for the fuel cell-purpose electrolyte material of the invention will be described. The fuel cell-purpose electrolyte material of the invention has the steps of: preparing a compound represented by the following general formula (3):

(3)

where n is 0 or a positive integer, and $R_1$ represents H or $CH_3$, and $R_2$ represents $(CH_2)_m SO_3 (CH_2)_p H$ (m is 0 or a positive integer, and p is 0 or a positive integer); and polymerizing the compound to form a polymer that has a structural unit represented by the following general formula (1):

(1)

where n is 0 or a positive integer, and $R_1$ represents H or $CH_3$, and $R_2$ represents $(CH_2)_m SO_3 H$ (m is 0 or a positive integer).

Next, the production method for the fuel cell-purpose electrolyte material of the invention will be exemplified in Synthesis Scheme I and Synthesis Scheme II. Details of Synthesis Scheme I and Synthesis Scheme II will be later described separately for each step, and will not be described herein.

Synthesis Scheme I

[Raw Material Synthesis Step]

(Reaction 1)

(Reaction 2)

(Reaction 3)

Next, the compound represented by the general formula (3) which, is used as a raw material in the invention will be described. In the general formula (3), $R_2$ represents $(CH_2)_m SO_3(CH_2)_p H$ (m is 0 or a positive integer, and p is 0 or a positive integer). The numerical range of m is not particularly limited, but is ordinarily within the range of 0 to 8, and preferably 0 or 1 and, particularly, 0. On the other hand, the numerical range of p is not particularly limited, but is ordinarily within the range of 0 to 3, and preferably within the range of 0 to 2. A suitable range of n in the general formula (3) is substantially the same as that in the foregoing general formula (1), and will not be described herein.

Concrete examples of the compound represented by the general formula (3) include compounds represented by structural formulas (3-a) to (3-j) below. Among them, the compound represented by the structural formula (3-a) is preferable.

(3-a)

(3-b)

(3-c)

(3-d)

(3-e)

(3-f)

(3-g)

(3-h)

(3-i)

(3-j)

Next, the production method for the fuel cell-purpose electrolyte material of the invention will be described separately for each step. Concretely, the production method will be described separately for a raw material synthesis step of synthesizing a compound represented by the general formula (3), a polymerization step of causing the ring-opening polymerization of the compound represented by the general formula (3), a hydrogenation step for hydrogenating the polymer obtained in the polymerization step, and an alkali treatment step of obtaining sulfonic acid groups by performing an alkali treatment of the compound obtained in the hydrogenation step.

1. Raw Material Synthesis Step

Firstly, the raw material synthesis step in the invention will be described. The raw material synthesis step in the invention is a step of synthesizing a compound represented by the general formula (3). As examples of the step, synthesis methods for a compound represented by the structural formula (3-a) and a compound represented by the structural formula (3-f) will be described. Incidentally, the compound represented by the structural formula (3-f) can be synthesized by using a compound represented by the structural formula (3-a).

(1) Synthesis of Compound Represented by Structure Formula (3-a)

The synthesis of a compound represented by the structural formula (3-a) will be described through the use of reactions 1 to 3 in the Synthesis Scheme I and Synthesis Scheme II mentioned above.

In the reaction 1, 2-chloroethanesulfonyl chloride [1] is dissolved in a solvent such as dichloromethane or the like, and ethanol [2] is added thereto. While the solution is being stirred in an ice-cold condition, triethylamine [3] is dropped into the solution. After the dropping, the solution is further stirred at room temperature. After that, the organic layer obtained by separating the reaction liquid is subjected to vacuum concentration and vacuum distillation, whereby ethyl vinylsulfonate [4] is obtained. In the reaction 2, dicyclopentadiene [5] is thermally decomposed to obtain cyclopentadiene [6]. In the reaction 3, the ethyl vinylsulfonate [4] obtained in the reaction 1 and the cyclopentadiene [6] obtained in reaction 2 are mixed, and the mixture is stirred while being heated. Then, the mixture is subjected to vacuum distillation, whereby a compound (ethyl bicyclo[2,2,1]hex-5-ene-2-sulfonate) [7] represented by the structural formula (3-a) is obtained.

(2) Synthesis of Compound Represented by Structural Formula (3-f)

The synthesis of a compound represented by the structural formula (3-f) will be described through the use of the following reaction 10.

In the reaction 10, the compound [7] represented by the structural formula (3-a) which is obtained in the reaction 3 and the cyclopentadiene [6] obtained in the reaction 2 are mixed, and the mixture is stirred while being heated. Then, the mixture is subjected to vacuum distillation, whereby a compound (ethyl tetracyclo$\{6.2.1.1^{36}.0^{27}\}$dodeca-4-ene-9-sulfonate) [15] represented by the structural formula (3-f) is obtained. Incidentally, by repeating the reaction described above, the number of n in the general formula (3) can be increased.

2. Polymerization Step

Next, the polymerization step in the invention will be described. The polymerization step in the invention is a step of causing the ring-opening polymerization of a compound represented by the general formula (3). In the invention, the polymerization may be performed by using only the compound represented by the general formula (3), or may also be performed by using the compound represented by the general formula (3) and a compound other than the compound represented by the general formula (3) (sometimes, referred to as "other compound").

Firstly, the case where the polymerization is performed through the use of only a compound represented by the general formula (3) will be described. A Concrete example of this case will be described through the use of a reaction 4 in Synthesis Scheme I. In the reaction 4, the compound [7] represented by the structural formula (3-a) which is obtained in the reaction 3 is cased to undergo the ring-opening polymerization, whereby a polymer [8] is obtained. In the invention, it is preferable to use a Grubbs catalyst (ruthenium complex) in the polymerization step. The Grubbs catalyst allows efficient production of the fuel cell-purpose electrolyte material. The Grubbs catalyst is not particularly limited as long as it is capable of accelerating the aforementioned polymerization reaction. In the invention, a Grubbs catalyst represented by the following structural formula is preferable.

Next, the case where the polymerization is performed through the use of the compound represented by the general formula (3) and an other compound will be described. In this case, the other compound is not particularly limited as long as it is polymerizable with the compound represented by the general formula (3). Examples of the other compound include unsaturated alicyclic hydrocarbon compounds, unsaturated hydrocarbon compounds, etc. Among them, unsaturated alicyclic hydrocarbon compounds are preferable.

The aforementioned unsaturated alicyclic hydrocarbon compound is not particularly limited, and concrete examples thereof include compounds represented by the following general formula (4):

(4)

where k is 0 or a positive integer, and $R_3$ represents H or $CH_3$. Incidentally, a preferable range of k in the general formula (4) is substantially the same as that in the general formula (2), and will not be described herein. Concrete examples of the compound represented by the general formula (4) include compounds represented by structural formulas (4-a) to (4-d). Among them, the compound represented by the structural formula (4-a) is preferable.

(4-a)

(4-b)

-continued (4-c)

(4-d)

The synthesis method for the compound represented by the general formula (4) is not particularly limited. For example, the compound represented by the general formula (4) can be synthesized by a method substantially the same as the synthesis method for the compound represented by the general formula (3).

A concrete example of the case where the polymerization is performed through the use of a compound represented by the general formula (3) and a compound represented by the general formula (4) will be described through the use of a reaction 7 in Synthesis Scheme II. In the reaction 7, the compound represented by the structural formula (3-a) which is obtained in the reaction 3 and a compound (2-norbornene) [11] represented by the structural formula (4-a) are dissolved in a solvent such as tetrahydrofuran (THF) or the like, and are caused to undergo the ring-opening polymerization through the use of a Grubbs catalyst mentioned above or the like. Thus, a polymer [12] is obtained. In this case, by sequentially reacting the compound [7] represented by the structural formula (3-a) and the compound [11] represented by the structural formula (4-a), a block copolymer can be obtained.

In the invention, it is allowable to use a chain transfer agent, a polymerization prohibiting agent, a chelating agent, etc., in the polymerization step in accordance with needs.

3. Hydrogenation Step

Next, the hydrogenation step in the invention will be described. The hydrogenation step in the invention is a step of hydrogenating the polymer obtained in the polymerization step.

A concrete example of the hydrogenation step will be described through the use of a reaction 5 in Synthesis Scheme I and a reaction 8 in Synthesis Scheme II. In the reaction 5, the polymer [8] obtained in the reaction 4 is reduced through the use of a reducing agent. Thus, a precursor [9] of the fuel cell-purpose electrolyte material is obtained. The reducing agent used in this case is not particularly limited as long as the agent is capable of adding hydrogen to a double bond or the like. In the invention, it is preferable to use p-toluenesulfonylhydrazide as the reducing agent. In the reaction 8, the polymer [12] obtained in the reaction 7 is reduced through the use of the aforementioned reducing agent. Thus, a precursor [13] of the fuel cell-purpose electrolyte material is obtained.

4. Alkali Treatment Step

Next, the alkali treatment step in the invention will be described. The alkali treatment step in the invention is a step of obtaining sulfonic acid groups by performing an alkali treatment of the compound obtained in the hydrogenation step.

A concrete example of the alkali treatment step will be described through the use of a reaction 6 in Synthesis Scheme I and a reaction 9 in Synthesis Scheme II. In the reaction 6, the precursor [9] of the fuel cell-purpose electrolyte material obtained in the reaction 5 is treated with NaI, KOH or the like, so as to obtain a fuel cell-purpose electrolyte material [10]. In the reaction 9, the precursor [13] of the fuel cell-purpose electrolyte material obtained in the reaction 8 is treated with NaI, KOH or the like, so as to obtain a fuel cell-purpose electrolyte material [14]. Incidentally, at the time of the precursor of the fuel cell-purpose electrolyte material, sulfonic acid groups are already provided. If there is no need to perform the alkali treatment step, the precursor of the fuel cell-purpose electrolyte material is as a fuel cell-purpose electrolyte material.

The invention is not limited to the foregoing embodiments. The foregoing embodiments are merely illustrative, and anything that has substantially the same construction as the technical idea described in the claims for patent and that achieves operation and effects similar to those of the technical idea is encompassed within the technical range of the invention.

The invention will further concretely described with reference to examples.

Example 1 will be described. In Example 1, a fuel cell-purpose electrolyte material was manufactured in accordance with Synthesis Scheme II mentioned above.

(Reaction 1)

24.80 g of 2-chloroethanesulfonyl chloride [1] was dissolved in 100 mL of dichloromethane, and 10.70 g of ethanol [2] was added. While the solution was being stirred in an ice-cold condition, 32.05 g of triethylamine [3] was dropped for 1 hour. After the dropping, the solution was further stirred at room temperature for 1 hour. After the reaction solution was washed with a 0.1N HCL aqueous solution, the organic layer was washed with pure water twice. The organic layer was dried with anhydrous magnesium sulfate, vacuum concentration was performed. The obtained oily substance was subjected to vacuum distillation, whereby 12.31 g of ethyl vinylsulfonate (colorless transparent liquid) [4] was obtained. The yield was about 60%. The obtained compound was identified by $^1$H-NMR.

(Reaction 2)

Dicyclopentadiene [5] was placed into a normal-pressure distillation device whose receptacle was cooled in a dry ice/methanol bath, and was stirred while being heated at an oil bus temperature of 160° C. At a distillation temperature of 40° C. to 100° C., cyclopentadiene (colorless transparent liquid) [6] was obtained. The obtained compound was identified by gas chromatography (GC) and $^1$H-NMR.

(Reaction 3)

11.77 g of the ethyl vinylsulfonate [4] obtained in the reaction 1 and 4.77 g of the cyclopentadiene [6] obtained in the reaction 2 were mixed, and the mixture was stirred for 40 minutes while being heated at 40° C. At this time, the disappearance of the raw materials was confirmed by thin-layer chromatography (TLC). After that, the reaction solution was subjected to vacuum distillation under the condition of 115° C. and 3 mmHg, whereby 9.71 g of ethyl bicyclo[2,2,1]hex-5-ene-2-sulfonate (colorless transparent liquid) [7] was obtained. The yield was about 67%. The obtained compound was identified by GC and $^1$H-NMR.

(Reaction 7)

5.19 g of ethyl bicyclo[2,2,1]hex-5-ene-2-sulfonate [7], 20.44 g of 2-norbornene [11], and 175.64 g of tetrahydrofuran (THF) were fed into a three-necked flask in a nitrogen atmosphere, and 4.76 g of diethyl succinate was put in as an internal standard for the GC. At this time, sampling was performed, and the obtained sample was used as an initial sample for the GC. Next, after the reaction solution was deaerated by bubbling it with nitrogen for 10 to 15 minutes, a solution of 0.042 g of a Grubbs catalyst in 16 mL of THF was added. The solution was then stirred at room temperature. The reaction was monitored by the GC, and it was confirmed that the reaction rate became 0% in two hours. Next, the reaction solution was stirred in air for 30 minutes. After that, a solution of 0.40 g of ethyl vinyl ether as a chain transfer agent and 0.51 g of hydroquinone as a polymerization prohibiting agent in 50 g of THF was added to the reaction solution. Then, the solution was stirred for 30 minutes. Next, the reaction solution was subjected to reprecipitation using methanol, for purification. After that, the filtered-out substance was dissolved in THF, and was reprecipitated therefrom with methanol (3 times in total). After that, the precipitate was dried through the use of a dryer (60° C.), thus obtaining 25 g of the polymer [12]. The yield was about 100%. The obtained compound was identified by $^1$H-NMR. The purity and the molecular weight thereof were measured by the GPC.

(Reaction 8)

The polymer [12] obtained in the reaction 7 was added into a recovery flask, and was dissolved in THF. After that, p-toluenesulfonylhydrazide was put in, and reflux was performed. Reprecipitation was performed for purification. The obtained compound was put into hexamethylphosphorous triamide (HMPA), and the mixture was stirred at 80° C. for 15 hours. After that, filtration and drying were performed to obtain a precursor [13] of the fuel cell-purpose electrolyte material. The obtained compound was identified by $^1$H-NMR.

(Reaction 9)

The precursor [13] of the fuel cell-purpose electrolyte material was subjected to the alkali treatment to obtain the fuel cell-purpose electrolyte material [14].

Next, Example 2 will be described. In Example 2, a fuel cell-purpose electrolyte material was manufactured in accordance with Synthesis Scheme II mentioned above.

(Reactions 1 to 3)

Ethyl bicyclo[2,2,1]hex-5-ene-2-sulfonate [7] was obtained in substantially the same manner as in Example 1.

(Reaction 7)

2.50 g of ethyl bicyclo[2,2,1]hex-5-ene-2-sulfonate [7], 23.14 g of 2-norbornene [11], and 530.15 g of tetrahydrofuran (THF) were fed into a three-necked flask in a nitrogen atmosphere, and 4.46 g of diethyl succinate was put in as an internal standard of the GC. At this time, sampling was performed, and the obtained sample was used as an initial sample for the GC. Next, after the reaction solution was deaerated by bubbling it with nitrogen for 10 to 15 minutes, a solution of 0.0405 g of a Grubbs catalyst in 19.93 mL of THF was put in. The solution was stirred at room temperature. The reaction was monitored by the GC, and it was confirmed that the reaction rate became 0% in 2 hours. Next, the reaction solution was stirred in air for 30 minutes. After that, a solution of 0.40 g of ethyl vinyl ether as a chain transfer agent and 0.65 g of hydroquinone as a polymerization prohibiting agent in 50 g of THF was put into the reaction solution. Then, the solution was stirred for 30 minutes. Next, the reaction solution was subjected to reprecipitation using methanol, for purification. After that, the filtered-out substance was dissolved in THF, and was reprecipitated therefrom with methanol (3 times in total). After that, the precipitate was dried through the use of a dryer (60° C.), thus obtaining 25 g of the polymer [12]. The yield was about 100%. The obtained compound was identified by $^1$H-NMR. The purity and the molecular weight thereof were measured by the GPC.

(Reactions 8 and 9)

The fuel cell-purpose electrolyte material [14] was obtained in substantially the same manner as in Example 1.

[Evaluation]

(Breaking Elongation)

A sheet-like specimen (30 μm in membrane thickness) was manufactured from the fuel cell-purpose electrolyte materials obtained in Example 1 and Example 2. The breaking elongation of the specimen was measured through the use of an autograph (a universal material tester, an Instron, by Shimadzu Seisakusho) according to JIS K7113 "Tension Test Method for Plastics". The measurement was performed with the inter-chuck distance being 5 mm, and the tensile speed being 10 mm/min. The elongation rate was calculated from the following equation.

elongation rate (%)=(break-time elongation−inter-chuck distance)/inter-chuck distance×100

Figure 1:
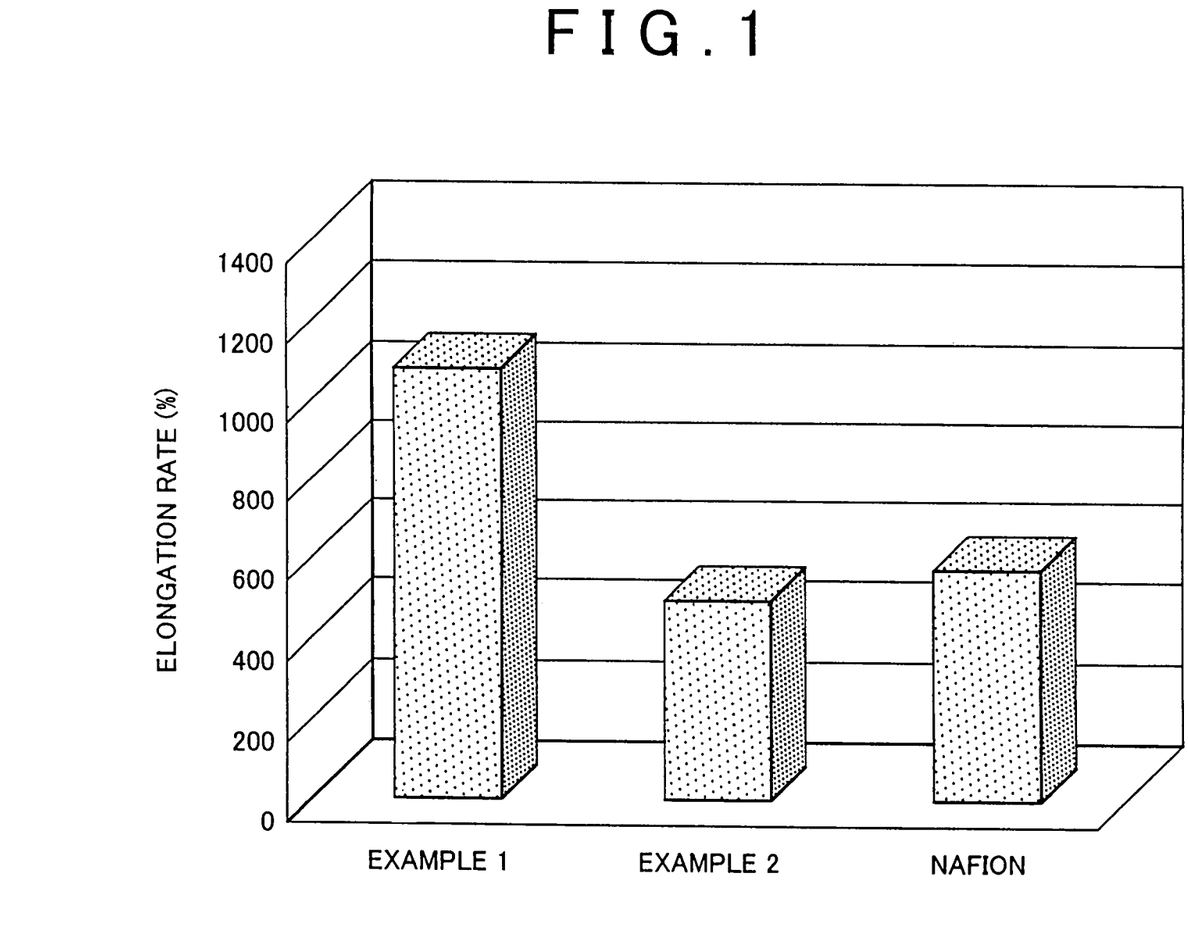
FIG. 1 is a graph showing results of a breaking extension test on Example 1 and Example 2 of the fuel cell-purpose electrolyte material of the invention.

Obtained results are shown in FIG. 1. As a comparison, Nafion (registered trademark, by DuPont) was subjected to the measurement of breaking elongation in substantially the same manner. As shown in FIG. 1, the fuel cell-purpose electrolyte materials obtained in Example 1 and Example 2 exhibited breaking elongations that are comparable to or better than that of Nafion (registered trademark, by DuPont).

(Fenton's Test/Hot Water Dissolution Test)

Membranous specimens were manufactured from the fuel cell-purpose electrolyte materials obtained in Example 1 and Example 2. Using these specimens, the Fenton's test was performed in the following procedure, in accordance with the method of Curtin et al (D. E. Curtin, R. D. Lousenberg, T. J. Henry, P. C. Tangeman, and M. E. Tisack, the Proceedings of the Tenth Grove Fuel Cell Symposium, A24, p. 121 (2003)). Firstly, 100 mL of a 30% hydrogen peroxide solution containing 20 ppm of $FeSO_4.7H_2O$ was prepared as a test liquid. On the other hand, the specimens were subjected to vacuum drying (80° C., 0.1 Torr, 2 hours), and then to precise weighing. Next, the specimens were dipped into the test liquid (80±1° C., 20 hours). After the post-test specimens were subjected to water washing, the specimens were washed in boiling pure water (for 0.5 hour twice). Then, after vacuum drying (80° C., 0.1 Torr, 2 hours), the specimens were subjected to precise weighing. The weight reduction rates of the post-test specimens were calculated from the following equation:

remnant weight rate (%)=(pre-test specimen weight−post-test specimen weight)/pre-test specimen weight×100.

Figure 2:
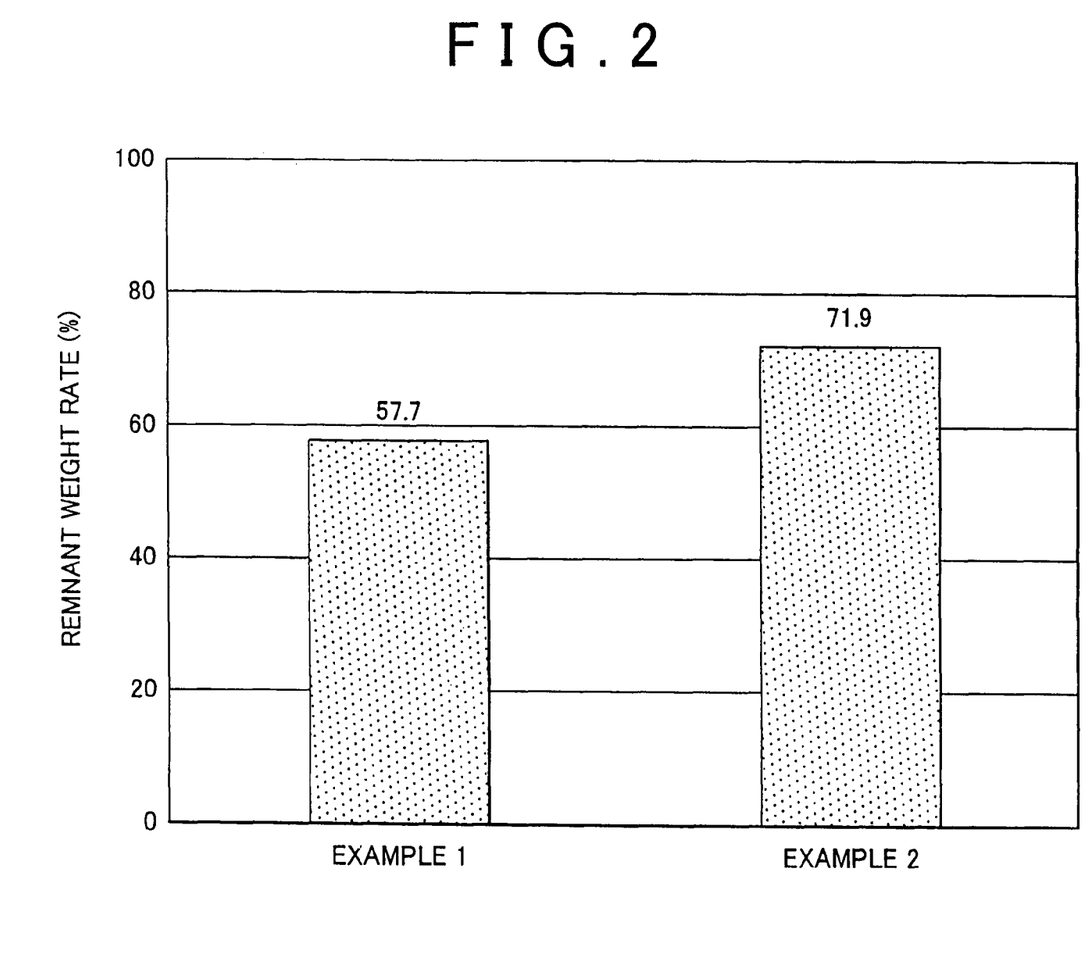
FIG. 2 is a graph showing results of a Fenton's test on Example 1 and Example 2 of the fuel cell-purpose electrolyte material of the invention.

Obtained results are shown in FIG. 2. As shown in FIG. 2, it became clear that the fuel cell-purpose electrolyte materials obtained in Example 1 and Example 2 are high in the remnant weight rate even if they are dipped in a high-concentration ferric ion solution. Incidentally, although it is common to use a 3-to-4 ppm ferric ion solution in the Fenton's test, a 20-ppm ferric ion solution was used in the foregoing test.

(Proton Conductivity)

Rectangular membranous specimens (4 cm×1 cm in size) were prepared from the fuel cell-purpose electrolyte material obtained in Example 1 and Example 2. The proton conductivity of each specimen was measured by an alternating-current impedance method. Firstly, each specimen and a Pt electrode plate were fixed to a polytetrafluoroethylene (PTFE)-made cell having a 1 cm-square window. The Pt electrode plate distance was 1 cm. The cells were placed in the tanks of a small-size environment test system, and the tank internal temperature was set at 25° C., 40° C., 60° C., and 80° C., and the relative humidity was set at 100% RH. After that, the measurement was performed by using an impedance analyzer (4194A, YHP) in the following conditions. The mean value of the conductance at a frequency at which the electric capacitance becomes minimum was taken as a measurement (G: in the unit of S). After the measurement, the membrane thickness (d: in the unit of μm) of each specimen was measured by using a vernier caliper, and the value found by the following equation was determined as the conductivity of the specimen (σ: in the unit of S/cm).

measurement frequency: 100 Hz to 1 MHz
applied AC voltage: 0.05 Vrms
mean number of times: 4 times
integral time: 5 msec
number of measurement points: 81 points
conductivity σ=(G/d)×10000

Figure 3:
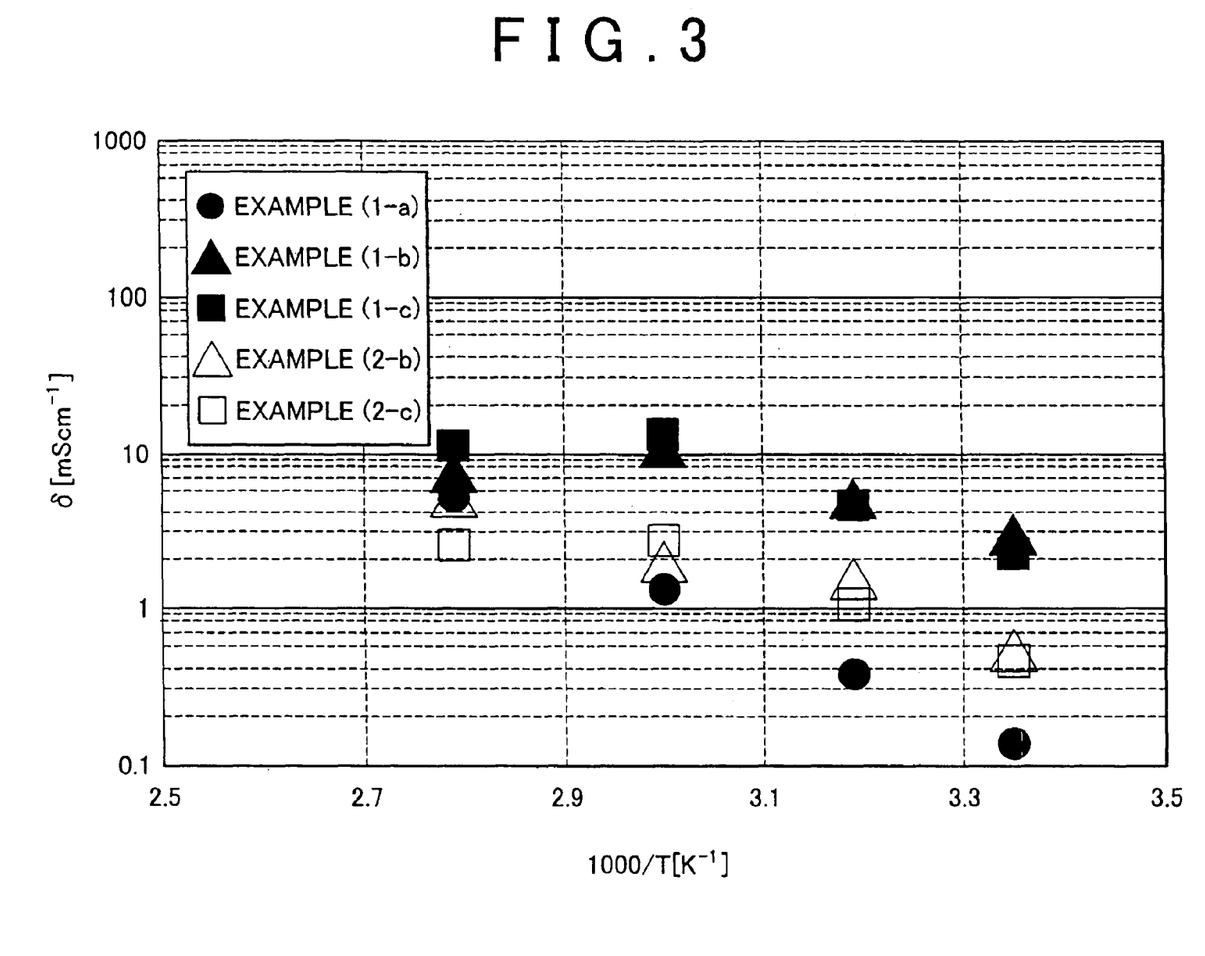
FIG. 3 is a graph showing results of a proton conductivity test on Example 1 and Example 2 of the fuel cell-purpose electrolyte material of the invention.

Obtained results are shown in FIG. 3. In FIG. 3, Examples (1-a), (1-b) and (1-c) represent specimens manufactured from the fuel cell-purpose electrolyte material obtained in Example 1. Specifically, Example (1-a) represents a specimen that was not subjected to the pre-treatment, and Example (1-b) represents a specimen that was subjected to a boiling treatment in pure water at 40° C. for 2 hours prior to the measurement, and Example (1-c) represents a specimen that was subjected to a boiling treatment in pure water at 60° C. for 2 hours prior to the measurement. Furthermore, Examples (2-b) and (2-c) represent specimens manufactured from the fuel cell-purpose electrolyte material obtained in Example 2. Specifically, Example (2-b) represents a specimen that was subjected to a boiling treatment in pure water at 40° C. for 2 hours prior to the measurement, and Example (2-c) represents a specimen that was subjected to a boiling treatment in pure water at 60° C. for 2 hours prior to the measurement.

(Gas Permeability)

Figure 4A:
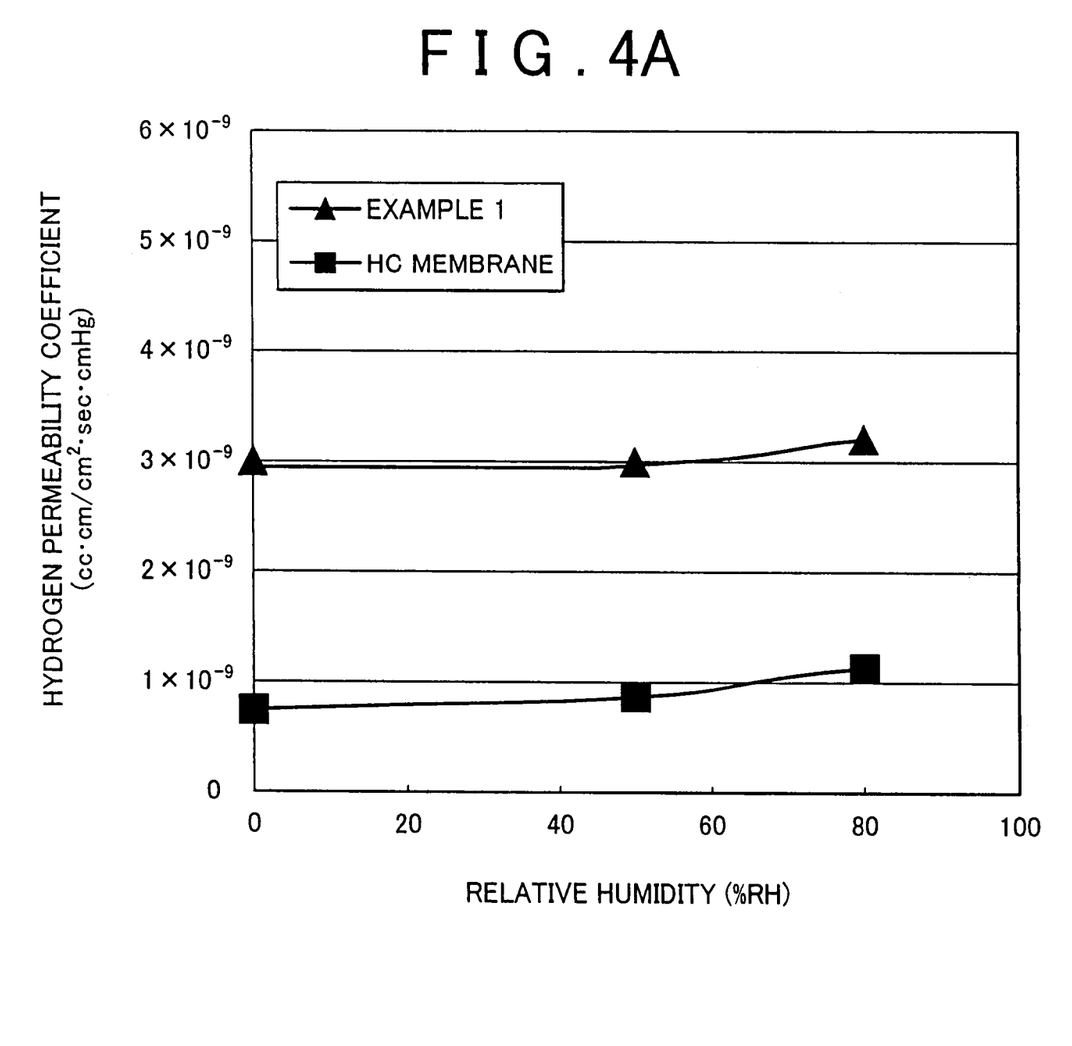
FIGS. 4A and 4B are graphs showing results of a gas permeability test on Example 1 of the fuel cell-purpose electrolyte material of the invention.
Figure 4B:
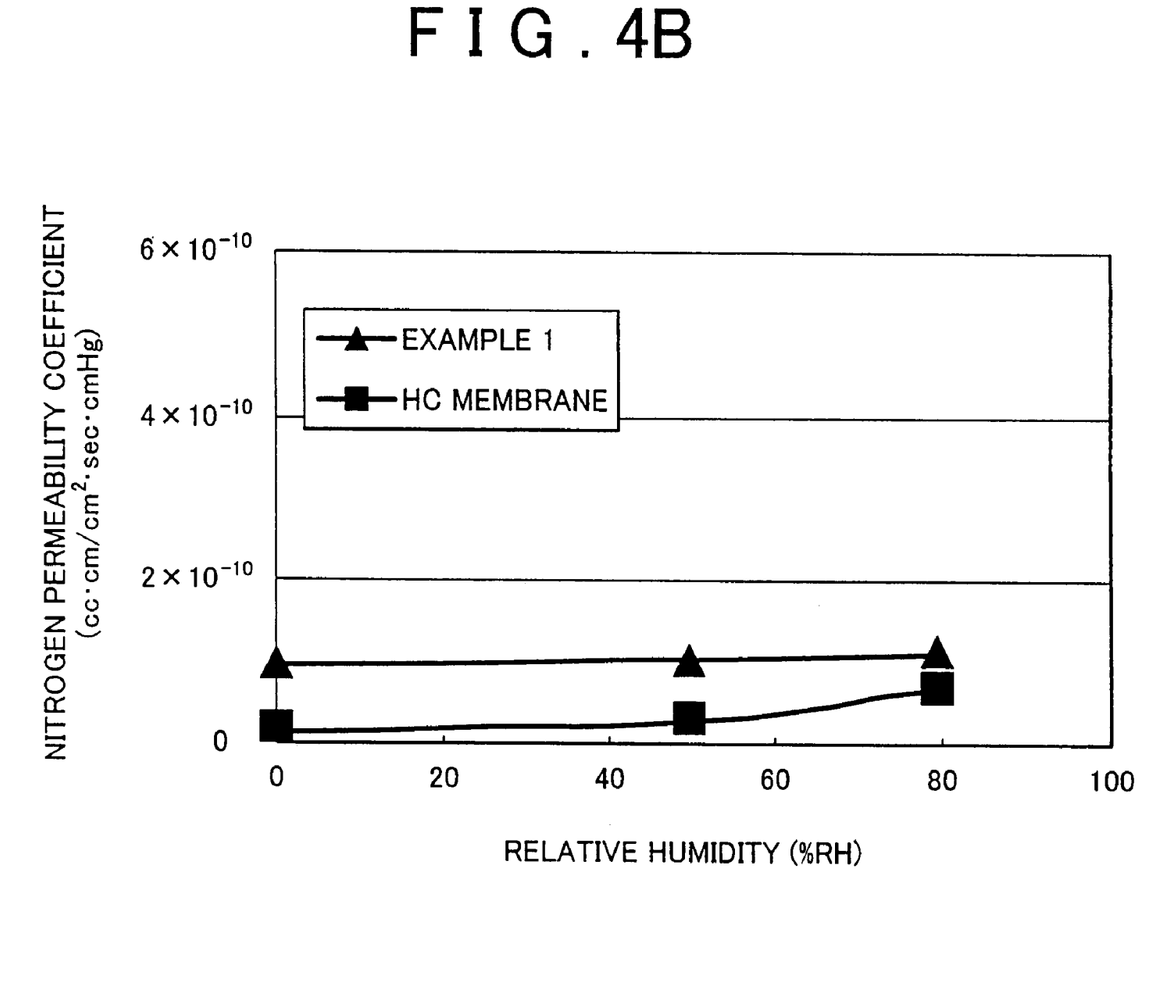

Specimens of φ5 cm were manufactured from the fuel cell-purpose electrolyte material obtained in Example 1. Next, the hydrogen permeability coefficient and the nitrogen permeability coefficient of each specimen were found in an equal pressure method at 80° C. in a dry or 80 RH % condition. The measurement was performed after three hours elapsed following the placement of the specimens, in order to ensure saturation. Obtained results are shown in FIGS. 4A and 4B. As shown in FIGS. 4A and 4B, the fuel cell-purpose electrolyte material obtained in Example 1 was higher in the hydrogen permeability coefficient and the nitrogen permeability coefficient than a hydrocarbon-based membrane (HC membrane).

(Dynamic Viscoelasticity)

With regard to the fuel cell-purpose electrolyte material obtained in Example 1, the dynamic viscoelasticity was measured in the following condition:

sample shape: strip shape
width: 5 mm
inter-chuck distance: 25 mm
temperature: −150° C. to the decomposition temperature or lower
rate of temperature rise: 5° C./min
frequency: 10 Hz In consequence, the glass transition temperature of the fuel cell-purpose electrolyte material obtained in Example 1 was about 120° C.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the appended claims.

The invention claimed is:

1. A fuel cell-purpose electrolyte material comprising:
a structural unit represented by a general formula (1):

(1)

where n is 0 or a positive integer, $R_1$ represents H or $CH_3$, and $R_2$ represents $(CH_2)_m SO_3 H$ (m is 0 or a positive integer); and
a structural unit that has a saturated alicyclic hydrocarbon.

2. The fuel cell-purpose electrolyte material according to claim 1, wherein the structural unit that has the saturated alicyclic hydrocarbon is represented by a general formula (2):

(2)

where k is 0 or a positive integer, and R3 represents H or CH3.

3. The fuel cell-purpose electrolyte material according to claim 1, wherein the fuel cell-purpose electrolyte material is a block copolymer that has a structural unit represented by the general formula (1) and the structural unit that has the saturated alicyclic hydrocarbon.

4. A fuel cell-purpose solid electrolyte membrane comprising the fuel cell-purpose electrolyte material according to claim 1.

5. A production method for a fuel cell-purpose electrolyte material, comprising:
preparing, as a raw material, a compound represented by a general formula (3):

(3)

where n is 0 or a positive integer, and R1 represents H or CH3, and R2 represents (CH2)$_m$SO3(CH2)pH (m is 0 or a positive integer, and p is 0 or a positive integer); and polymerizing the compound to form a polymer that has a structural unit represented by a general formula (1):

(1)

where n is 0 or a positive integer, and R1 represents H or CH3, and R2 represents (CH2)$_m$SO3H (m is 0 or a positive integer).

6. The production method for a fuel cell-purpose electrolyte material according to claim 5, wherein in the polymerizing step, by using as a raw material a compound represented by a general formula (4):

(4)

where k is 0 or a positive integer, and R3 represents H or CH3, and wherein a structural unit represented by a general formula (5):

(5)

where x is a positive integer, and n is 0 or a positive integer, and R1 represents H or CH3, and R2 represents (CH2)$_m$SO3H (m is 0 or a positive integer), and y is a positive integer, and k is 0 or a positive integer, and R3 represents H or CH3, is formed.

7. The production method for a fuel cell-purpose electrolyte material according to claim 5, wherein in the polymerizing step, a Grubbs catalyst is used.

* * * * *